(12) United States Patent
Löhken et al.

(10) Patent No.: US 9,598,889 B2
(45) Date of Patent: Mar. 21, 2017

(54) MOVEMENT-DAMPING UNIT AND SPRING UNIT COMPRISING A MOVEMENT-DAMPING UNIT OF THIS TYPE

(71) Applicant: Stabilus GmbH, Koblenz (DE)

(72) Inventors: Lars Löhken, Bonn (DE); Ulrich Probst, Hillscheid (DE); Christoph Ulrich, Kratzenburg (DE); Markus Müller, Koblenz (DE); Joshua Burrell, Koblenz (DE)

(73) Assignee: Stabilus GmbH, Koblenz (DE)

( * ) Notice: Subject to any disclaimer, the term of this patent is extended or adjusted under 35 U.S.C. 154(b) by 39 days.

(21) Appl. No.: 14/718,555

(22) Filed: May 21, 2015

(65) Prior Publication Data

US 2015/0337586 A1   Nov. 26, 2015

(30) Foreign Application Priority Data

May 26, 2014 (DE) ........................ 10 2014 210 001

(51) Int. Cl.
*E05F 5/02* (2006.01)
*F16F 13/00* (2006.01)
(Continued)

(52) U.S. Cl.
CPC ............. *E05F 5/022* (2013.01); *F16F 7/085* (2013.01); *F16F 7/09* (2013.01); *F16F 13/005* (2013.01)

(58) Field of Classification Search
CPC .... E05F 5/022; F16F 7/085; F16F 7/09; F16F 13/005; F16F 9/34; B60G 15/04
(Continued)

(56) References Cited

U.S. PATENT DOCUMENTS 3,388,883 A * 6/1968 Wossner .................. A47B 9/10
188/300
4,045,008 A 8/1977 Bauer
(Continued)

FOREIGN PATENT DOCUMENTS

DE   1944423   8/1966
DE   2450061   4/1976
(Continued)

OTHER PUBLICATIONS

European Search Report filed in EP 15168615 mailed Oct. 27, 2015.
(Continued)

*Primary Examiner* — Melanie Torres Williams
(74) *Attorney, Agent, or Firm* — Rankin, Hill & Clark LLP (57) ABSTRACT

The invention relates to a movement-damping unit (30) comprising a receiving tube (32) having a longitudinal axis (A), a relative movement unit (34) which is received in the receiving tube (32) and which is displaceable back and forth relative to the receiving tube (32) substantially in the direction of the longitudinal axis (A), and a friction device (41) acting between the receiving tube (32) and the relative movement unit (34). According to the invention, the friction device (41) comprises at least one switching element (44, 48) assigned to the relative movement unit (34) and having an engagement portion (48*a*) formed so as to widen radially in the direction of the longitudinal axis (A), wherein at least one resiliently compressible friction element (46, 50), which comprises a recess (50*a*) intended for engagement with the engagement portion (48*a*) and is arranged on the longitudinal face of smaller diameter of the switching element (44, 48), is assigned to each switching element (44, 48).

13 Claims, 4 Drawing Sheets

(51) Int. Cl.
*F16F 7/08* (2006.01)
*F16F 7/09* (2006.01)

(58) Field of Classification Search
USPC .......... 267/140.13; 188/300, 322.13, 322.15, 188/322.17, 322.18
See application file for complete search history.

(56) References Cited

U.S. PATENT DOCUMENTS

| | | | |
|---|---|---|---|
| 5,884,734 A | 3/1999 | Hiramoto et al. | |
| 6,007,057 A | 12/1999 | Fuhrmann et al. | |
| 6,942,204 B2 | 9/2005 | Wolf et al. | |
| 2006/0151271 A1* | 7/2006 | Rova .................... | F16F 9/3405 188/322.15 |

FOREIGN PATENT DOCUMENTS

| | | | |
|---|---|---|---|
| DE | 2516478 | 10/1976 | |
| DE | 2540648 | 3/1977 | |
| DE | 19649836 | 6/1998 | |
| DE | 10236137 | 2/2004 | |
| DE | 102005007741 | 8/2006 | |
| DE | 102006047867 | 4/2008 | |
| FR | 1077611 A * | 11/1954 | ................ F16F 7/09 |
| WO | 2013/112621 | 8/2013 | |

OTHER PUBLICATIONS

Search Report from German Patent and Trademark Office in DE 10 2014 210 001.1 (Apr. 8, 2015).

* cited by examiner

MOVEMENT-DAMPING UNIT AND SPRING UNIT COMPRISING A MOVEMENT-DAMPING UNIT OF THIS TYPE

The invention relates to a movement-damping unit comprising a receiving tube having a longitudinal axis, a relative movement unit which is received in the receiving tube and which is displaceable back and forth relative to the receiving tube substantially in the direction of the longitudinal axis, and a friction device acting between the receiving tube and the relative movement unit.

Movement-damping units of this type are used as end position dampers, for example in devices having two parts which are movable back and forth relative to one another between a first end position and a second end position, so as, by way of the friction device, to prevent excessively abrupt braking of the relative movement of the two parts when one of the end positions is reached and to reduce, if not completely prevent, the resulting risk of damage to the device and the accompanying noise production. Movement-damping units of this type are used for example in lids and/or hatches of motor vehicles, for example boot lids and/or luggage compartment hatches, but also in sliding doors which are adjustable between a closed position (first end position) and an open position (second end position). This applies not only to conventional movement-damping units, but also to those according to the invention.

A problem with known movement-damping units is that the friction device is effective not only when the two end positions are approached, as desired, but also when the two parts—in the present case the receiving tube and the relative movement unit—move back out of the end position towards the other end position.

Therefore, an object of the present invention is to develop a conventional movement-damping unit in such a way that the friction device acts with a lower damping force when the receiving tube and the relative movement unit move back out of the end position towards the other end position relative to one another than when the respective end position is approached.

This object is achieved according to the invention by a movement-damping unit of the aforementioned type, wherein the friction device comprises at least one switching element assigned to the relative movement unit and an engagement portion formed so as to widen radially in the direction of the longitudinal axis, at least one resiliently compressible friction element, which comprises a recess intended for engagement with the engagement portion and is arranged on the longitudinal face of smaller diameter of the switching element, being assigned to each switching element.

For reasons of simpler illustration, in the following discussion of the present invention, a coordinate system stationary with respect to the receiving tube is assumed in relation to the relative movement between the receiving tube and the relative movement unit, in such a way that the entire relative movement between the receiving tube and the relative moment unit comes from a movement of the relative movement unit.

When the relative movement unit approaches the end position in question in each case, the engagement portion of the switching element moves into the recess in the compressible friction element, thus widening it and pressing it outwards against the inner circumferential face of the receiving tube, causing a frictional force, which damps the movement of the relative movement unit, to be produced between the friction element, entrained by the relative movement unit, and the receiving tube. In principle, it is actually advantageous for the friction element to already cooperate with the receiving tube in a frictional fit to some extent before the engagement portion of the switching element engages in the recess in the friction element. As a result, on the one hand some guidance of the relative movement unit in the receiving tube can be provided, and this for example facilitates the reduction or even prevention of noise production due to the relative movement of the receiving tube and the relative movement unit. On the other hand, however, this can also facilitate the entry of the engagement portion into the recess. In this connection, however, for particularly rapid relative movement of the receiving tube and the relative movement unit it is also conceivable for the friction element initially still to remain at rest because of the mass inertia thereof when the switching element meets the friction element, and for this to widen the friction element to the extent that it enters frictional engagement with the receiving tube and thus provides sufficient resistance to the entrainment by the switching element for the engagement portion to penetrate deeper into the recess.

If the relative movement unit is moved back out of the end position thus reached, the engagement portion of the switching element is pulled out of the recess in the friction element as a result of the frictional engagement of the friction element and receiving tube. As a result, the friction element can expand radially inwards again under the inherent resilience thereof, reducing the contact pressure thereof against the inner circumferential face of the receiving tube and thus the total damping force produced. There is thus less damping force countering the movement out of the end position than the movement into the end position.

If the force damping the approach to the end positions is not intended to be effective over the entire path of the relative movement of the receiving tube and the relative movement unit, it is advantageous for the receiving tube to comprise a first longitudinal portion and a second longitudinal portion, the internal diameter of the first longitudinal portion being larger than the internal diameter of the second longitudinal portion. In any case, in the first guide portion, as a result of the larger diameter thereof and the resulting lower (if even present) compression of the friction element, a lower (if even present) frictional force is produced between the friction element and the receiving tube than in the second guide portion. The transition between the first longitudinal portion and the second longitudinal portion of the receiving tube may for example be made conical. Further, it is in principle conceivable to provide more than two longitudinal portions of different diameters.

If the internal diameter of the first longitudinal portion of the receiving tube is greater than the external diameter of the friction element or at least one friction element in the uncompressed state thereof, and the internal diameter of the second longitudinal portion of the receiving tube is smaller than the external diameter of the friction element or at least one friction element in the uncompressed state thereof, the friction element is not in frictional engagement with the inner circumferential face of the receiving tube when said friction element is in the region of the first longitudinal portion, and so the relative movement of the receiving tube and the relative movement unit can take place substantially without damping.

So as to be able to ensure that the friction element does not remain in the end position, and thus moves out of the action region of the switching element, when the relative movement unit moves back out of the end position, a development of the invention proposes that a stop element is assigned to the switching element, adjacently to the longitudinal end thereof of smaller diameter. When the switching element has moved sufficiently far away from the friction element that the engagement portion of the switching element is not engaged with the recess in the friction element, the stop element has the task of entraining said friction element in the further combined movement of the switching element and relative movement unit, in such a way that said friction element remains in the action region of the switching element.

It may advantageously be provided that the switching element and the stop element are formed as separate components.

It may further be provided that the switching element is provided, on the longitudinal end thereof of smaller diameter, with a bearing portion, on which the at least one friction element assigned to the switching element is mounted displaceably relative to the switching element in the direction of the longitudinal axis. The bearing portion thus acts as a spacer between the engagement portion of the switching element and the stop element. In this case, the length of the bearing portion is preferably dimensioned such that on the one hand complete disengagement of the engagement portion of the switching element from the recess in the friction element is possible upon movement out of the end position, and on the other hand rapid engagement of the engagement portion of the switching element in the recess in the friction element is possible when the end position is approached.

It may advantageously be provided that the switching element and the bearing portion are formed integrally.

So as to be able to prevent the at least one friction element from moving out of the action region of the switching element at the longitudinal end of larger diameter of the switching element, it is proposed that the switching element is provided with an annular shoulder at the longitudinal end thereof of larger diameter. The external diameter of this annular shoulder may advantageously be smaller than the internal diameter of the second longitudinal portion of the receiving tube. If a plurality of switching elements is arranged in succession, for two directly adjacent switching elements, the annular shoulder of one switching element may form the stop element of the other switching element. The annular shoulder and the switching element are preferably formed integrally with one another.

A development of the invention proposes that the at least one switching element is operatively connected to the relative movement unit. This configuration has the advantage of reducing, if not completely preventing, noises which would inevitably occur when the movement direction of the relative movement unit changes when the switching element and the relative movement unit meet one another if the at least one switching element were movable to some extent in the direction of the longitudinal axis relative to the relative movement unit. Further, this can also ensure reproducible friction relationships and thus reproducible operation of the movement-damping unit.

For example, the at least one switching element may be screwed onto the relative movement unit. However, it is also conceivable to slide the at least one switching element, and optionally also the bearing portion and/or the stop element, onto a first longitudinal portion of the relative movement unit until it comes into contact with a shoulder formed between the first longitudinal portion of the relative movement unit and a second longitudinal portion of the relative movement unit of a greater diameter than the first longitudinal portion. After being slid on, preferably substantially without play, the at least one switching element may be gripped in place between the contact shoulder and a securing element, for example a locknut, a securing pin, a securing clamp or the like. Rotation of the at least one switching element around the relative movement unit can be prevented by splining between the switching element and the relative movement unit. Finally, bonding between the at least one switching element and the relative movement unit is also further conceivable, for example by gluing, brazing, welding or the like.

A development of the invention proposes that the engagement portion of the switching element may have a first longitudinal portion, in which the engagement portion widens radially, and a second longitudinal portion, formed directly adjacent to the widened end of the first longitudinal portion and preferably formed in a substantially cylindrical manner. In this case, it is advantageous for the length of the radial portion of the switching element and the selection of the materials of the receiving tube and the switching element to be adapted to one another, in such a way that the static friction between the switching element and the friction element is less than the static friction between the receiving tube and the friction element. In this way, it can be ensured that the friction element can release from the switching element again during the movement out of the end position.

The radial widening of the engagement portion may for example be in the form of conical widening. In particular when the engagement portion has a radially widening longitudinal portion and a preferably cylindrical longitudinal portion, as described above, it may be advantageous for the radial widening to extend in a rounded manner at least in the transition between the two longitudinal portions. The advantage of this development is for example the lower mechanical stress and thus lower wear on the friction element by comparison with a sharp-edged transition.

The recess in the friction element may for example be formed as a substantially cylindrical recess. This recess may be preferred for example when gradual braking of the relative movement of the receiving tube and the relative movement unit is desired prior to the actual end position damping. Specifically, in this case when penetrating into the recess the engagement portion only engages with the inner circumferential face of the recess little by little. By contrast, if a shorter switching distance is desired, it is advantageous for the recess in the friction element to be formed in a manner adapted to the shape of the radial widening of the engagement portion, since in this case the engagement element engages with the entire inner circumferential face of the recess virtually simultaneously. In a structurally simple manner, both the radial widening of the engagement portion and the recess in the friction element may be substantially conical.

To provide the most abrupt switching possible, it may be provided in addition or alternatively that at least one radially outwardly protruding projection is provided at the transition between the two longitudinal portions of the engagement element and/or adjacent to said transition and/or that at least one radially inwardly protruding projection is provided at the transition between the two longitudinal portions of the receiving tube and/or adjacent to said transition. At both positions, even a projection having a dimension of merely approximately 0.2 to 0.3 mm in the radial direction can have a considerable effect on the switching properties of the movement-damping unit according to the invention.

So as to be able to provide a holding function for the movement-damping unit after the end position is reached, it is proposed that either the relative movement unit is held positively on the receiving tube so as to be adjacent to the end of the second longitudinal portion of the receiving tube facing away from the first longitudinal portion, or a third longitudinal portion of the receiving tube is connected to the end of the second longitudinal portion of the receiving tube facing away from the first longitudinal portion, the relative movement unit being held in a frictional fit in this third longitudinal portion of the receiving tube.

The positive holding may for example be provided by a mechanism such as is known for example for retracting and extending the nib in ball-point pens, in other words a mechanism in which a movement of the relative movement unit past a predetermined relative position with respect to the receiving tube, for example counter to a spring force, brings about a positive engagement between the relative movement unit and the receiving tube, whilst this positive fit is released again by a movement of the relative movement unit past the predetermined relative position again.

By contrast, the frictional holding may for example be achieved by forming the third longitudinal portion of the receiving tube with a Morse taper and by a shape adapted thereto of the end of the relative movement unit. However, it is also possible for the internal diameter of the third longitudinal portion of the receiving tube to be smaller than the internal diameter of the second longitudinal portion and for the frictional force to be larger in magnitude than the forces acting on the movement-damping unit as a result of gravity. Further, a friction element, arranged so as to be stationary in the longitudinal direction on the relative movement unit and intended to engage with the third longitudinal portion of the receiving tube, may be provided.

It should be added that the relative movement unit may be guided on the receiving tube adjacently to the end thereof from which the relative movement unit exits the receiving tube. The guide element implementing this guidance and the relative movement unit may be mutually rotationally fixed in the circumferential direction, for example by providing splining of the relative movement unit and the receiving tube.

It should further be added that, at the end of the receiving tube assigned to the end position under consideration, the receiving tube or an end unit provided on this end may be formed with at least one ventilation passage, which is optionally provided with a throttle and/or valve. This measure can also affect the movement towards the end position and/or the movement out of the end position in the desired manner and/or to the desired extent. However, an unimpeded approach to the end position under consideration may also be provided simply by forming the friction element with passages and/or edge notches provided on the outer circumferential face thereof, which allow gas, preferably air, to pass through.

It should further be added that the receiving tube and/or the relative movement unit and/or the at least one switching element may be formed from a rigid material, for example metal or plastics material, and/or that the at least one friction element can be made from a compressible material, for example rubber or foam.

It should moreover be added that, to implement movement damping which acts in accordance with the invention in the region of both end positions, it is conceivable to arrange two switching element/friction element arrangements mutually inversely in relation to the longitudinal direction of the receiving tube. As a result, it can be provided that when one end position is approached only the switching element and the friction element of one switching element/friction element arrangement engage with one another, whilst the switching element and the friction element of the other switching element/friction element arrangement are held out of engagement with one another, the switching element/friction element arrangements operating the other way around when the other end position is approached.

Finally, it should also be added that the movement-damping unit according to the invention can be retrofitted to pre-existing devices in a simple manner. Further, it can be adapted to the respective application in a simple manner. For example, for otherwise equal dimensions, the damping force can be varied by altering the external diameter of the friction element and/or the diameter of the recess therein and/or the length of the friction element. However, it is also conceivable to alter the coefficient of friction by way of a targeted material selection. By arranging a plurality of switching element/friction element combinations in succession, it is possible to achieve a stepped increase in the damping force.

A further aspect of the invention relates to a spring unit comprising a movement-damping unit according to at least one of the above-described variants, wherein a first connection element for connection to a first superordinate assembly, for example to a lid of a motor vehicle, is provided at the end of the receiving tube opposing the end of the receiving tube at which the relative movement unit exits the receiving tube, wherein a second connection element for connection to a second superordinate assembly, for example to a body of the motor vehicle, is provided at the end of the relative movement unit projecting out of the receiving tube, and wherein a spring surrounding the receiving tube is provided, one end of said spring being braced directly or indirectly on the first connection element and the other end thereof being braced directly or indirectly on the second connection element.

In the following, the invention is described in greater detail by way of embodiments, referring to the accompanying drawings, in which, specifically.

Figure 1:
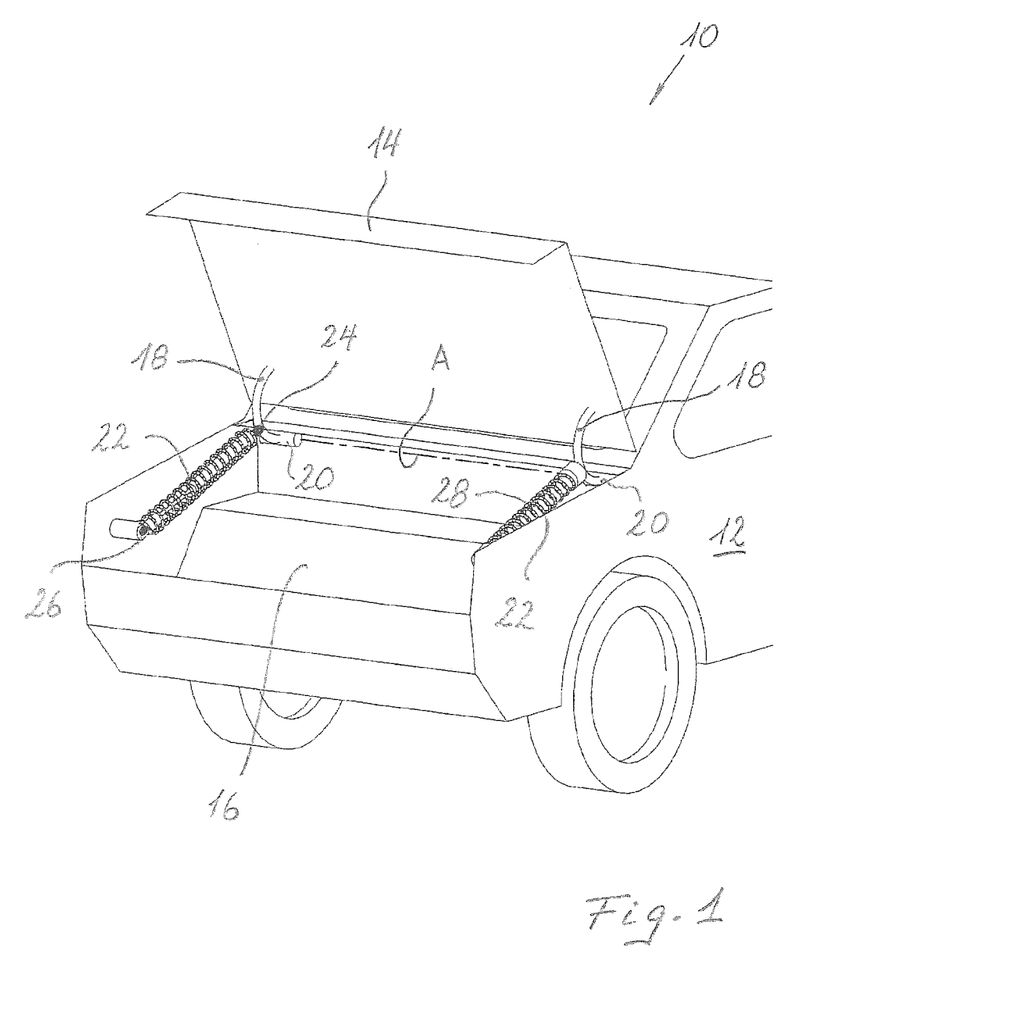
FIG. 1 is a perspective view of the tail region of a motor vehicle, the boot lid of which is equipped with spring elements according to the invention for assisting in the pivoting thereof.

FIG. 1 shows a motor vehicle 10 comprising a body 12 and a boot lid 14 for sealing a luggage compartment 16. The boot lid 14 is articulated to the body 12 via two pivot brackets 18 and two hinges 20 so as to be pivotable about a pivot axis A between an open position (see FIG. 1) and a closed position (not shown).

Two spring units 22 are further provided, each of which is articulated to the associated pivot bracket 18 via a connection element 24 and to the body 12 of the motor vehicle 10 via a connection element 26. Further, both spring units 22 comprise a helical tension spring 28. In addition, preferably at least one of the spring units 22 is formed with a movement-damping unit 30, the construction and operation of which are described in the following referring to FIGS. 2, 3 and 4.

Figure 2:
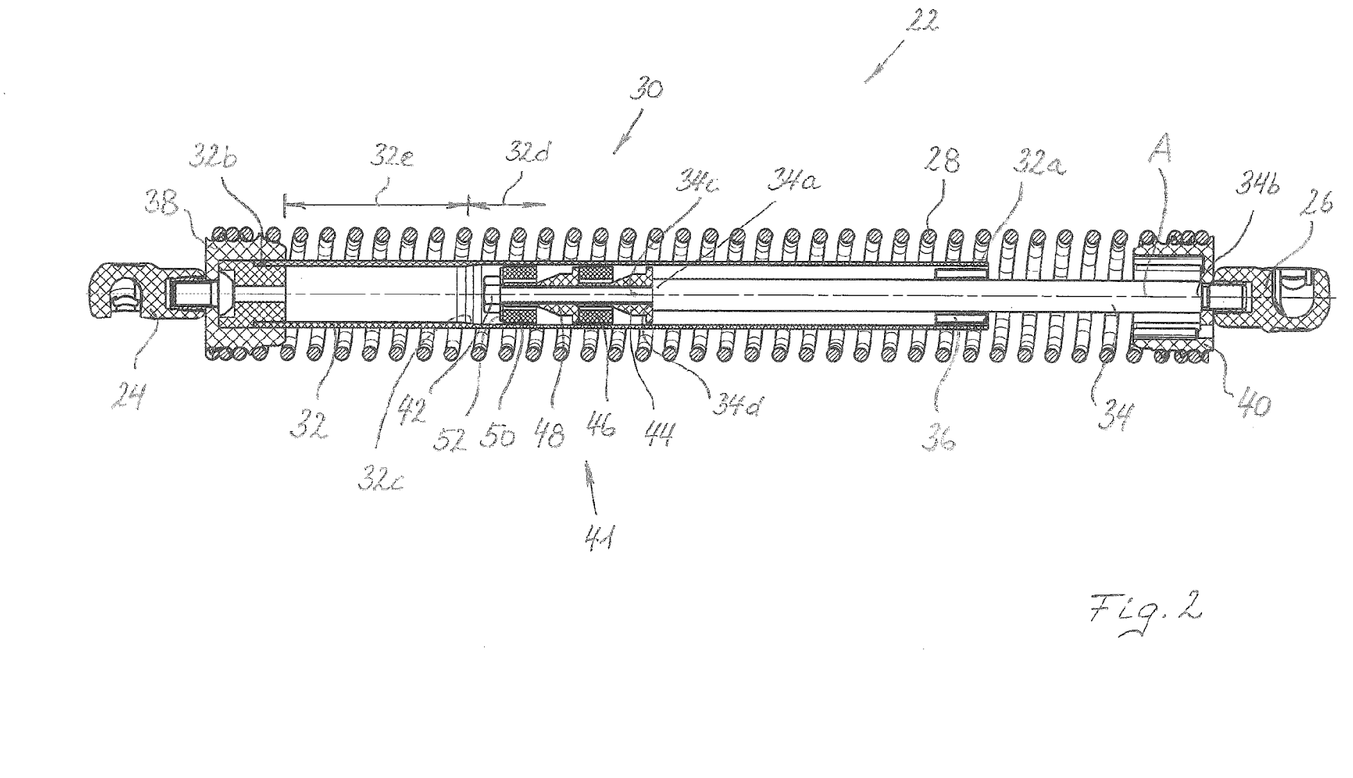
FIG. 2 is a section drawing of a first embodiment of a spring element according to the invention.

The movement-damping unit 30 comprises a receiving tube 32 and a rod 34, which acts as a relative movement unit and of which the end 34a, on the left in FIG. 2, is received in the receiving tube 32 and guided displaceably back and forth therein by means of a guide element 36. The guide element 36 is arranged at the end of the receiving tube 32 at which the rod 34 exits the receiving tube 32, which is thus denoted in the following as the exit end 32a of the receiving tube 32. The other end 32b of the receiving tube 32 is sealed by a sealing cap 38, which supports the connection element 24 rotatably about the longitudinal axis A of the receiving tube 32. Analogously, a sealing cap 40, which supports the connection element 26 rotatably about the longitudinal axis A of the receiving tube, is arranged at the end 34b of the rod 34 projecting out of the receiving tube 32. The spring 28 is braced on the sealing cap 38 at one end and on the sealing cap 40 at the other end.

At the end 34a thereof, on the left in FIG. 2, the rod 34 has a longitudinal portion 34c which is of a lower diameter than the rest of the rod 34 and thus forms a stop shoulder 34d together therewith. A friction device 41 is assigned to this longitudinal portion 34c. In particular, following elements forming the friction device 41 are slid onto this longitudinal portion 34c in succession, substantially without play, and clamped against the stop shoulder 34d by means of a locknut 42: a first switching element 44, a first friction element 46, a second switching element 48, a second friction element 50 and an end disc 52. To provide the movement-damping operation, these elements cooperate with one another and with the transition 32c between a first longitudinal portion 32d of the receiving tube 32, which portion extends as far as the end 32a of the receiving tube 32, and a second longitudinal portion 32e of the receiving tube 32, in the manner described in the following referring to FIGS. 3 and 4.

Figure 3:
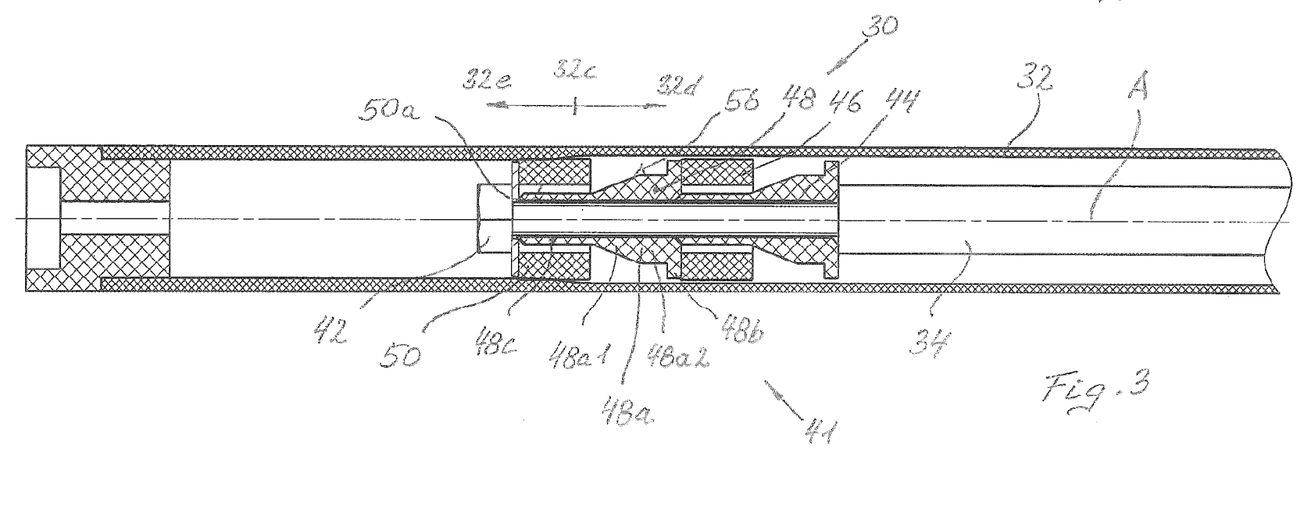
FIGS. 3 and 4 are section drawings illustrating the operation of the movement-damping unit of the spring element according to the invention.
Figure 4:
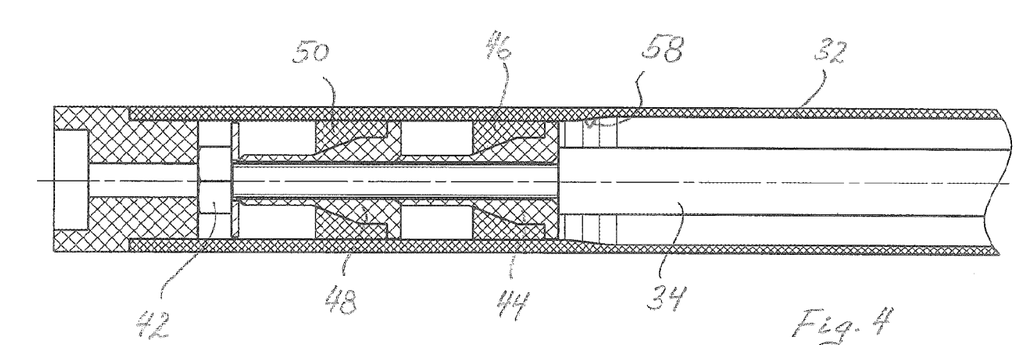

In the embodiment shown in FIGS. 2, 3 and 4, the two switching elements 44 and 48 and the two friction elements 46 and 50 are each formed identically. The construction and cooperation are therefore merely described with reference to the switching element 48 and the friction element 50, and reference can also be made to the description thereof for the switching element 44 and the friction element 46.

The switching element 48 is made of a substantially rigid material, for example of plastics material, preferably as an injection-moulded part, and comprises a radially widening portion 48a, an annular shoulder 48b formed integrally therewith, and a bearing portion 48c formed integrally with both of these. The portion 48a is subdivided into two longitudinal portions 48a1 and 48a2, the radial widening being brought about in the first longitudinal portion 48a1, whilst the second longitudinal portion 48a2 is substantially cylindrical. The external diameter of the annular shoulder 48b is smaller than the internal diameter of the two longitudinal portions 32d and 32e of the receiving tube 32.

By contrast, the friction element 50 is made of a resiliently compressible material, for example rubber or foam. It is of a preferably cylindrical shape and is provided with a central recess 50a, the internal diameter of which is greater than the external diameter of the bearing portion 48c of the switching element 48 but smaller than the external diameter of the cylindrical longitudinal portion 48a2 of the switching element 48. Further, the external diameter of the friction element 50 is smaller than the internal diameter of the first longitudinal portion 32d of the receiving tube 32 but greater than the internal diameter of the second longitudinal portion 32e of the receiving tube 32. All of these diameter specifications relating to the friction element 50 relate to a completely uncompressed state of the friction element 50.

If the friction device 41 is located in the region of the first longitudinal portion 32d of the receiving tube 32, the friction element 50 is arranged around the bearing portion 48c of the switching element 48, is not compressed and is at most in loose contact with the inner circumferential face of the receiving tube 32. If the rod 34 moves to the left in FIG. 3 together with the friction device 41, in the course of this movement the friction element 50 strikes the transition 32c between the longitudinal portions 32d and 32e of the receiving tube 32 and is obstructed thereby. During the further movement of the rod 34, the widening portion 48a of the switching element 48 enters the recess 50a in the friction element 50. As a result, the friction element 50 is compressed between the switching element 48 and the inner circumferential face of the second longitudinal portion 32e of the receiving tube 32. This leads to frictional forces being produced between the friction element 50 and the receiving tube 32, which forces damp the further movement of the rod 34 to the left in FIG. 3. These frictional forces increase until the friction element is completely slid onto the portion 48a (see FIG. 4) and is positioned laterally against the annular shoulder 48b, which ensures that the friction element 50 remains in the action region of the switching element 48.

The frictional forces between the receiving tube 32 and the friction device 41 increase further if the combination of the switching element 44 and the friction element 46 also enters the longitudinal portion 32e of the receiving tube 32 (see FIG. 4).

In accordance with the above, the movement of the rod 34 to the left in FIGS. 2, 3 and 4 into the end position shown in FIG. 4 is damped.

If the rod is now moved back to the right in FIGS. 2, 3 and 4, in other words out of the end position shown in FIG. 4, the friction elements 46 and 50 initially remain in frictional engagement with the receiving tube 32, whilst the switching elements 44 and 48 are moved to the right, in other words out of the recesses in the friction elements 46 and 50, as a result of the positive holding thereof together with the rod 34. This decreases the compression of the friction elements 46, 50 and thus also decreases the static friction between the friction elements 46, 50 and the receiving tube 32. Finally, the friction elements 46, 50 are again located completely in the region of the bearing portions of the switching elements 44, 48, and come to be positioned against the end disc 52 and the annular shoulder 48b of the other switching element 48, respectively, (which takes on the function of the end disc for the friction element 46), and are entrained to the right in FIGS. 2, 3 and 4 by said disc and shoulder during the further movement of the rod 34. This entrainment ensures that the friction elements 46, 50 remain in the action region of the switching elements 44, 48.

In accordance with the above, the movement of the rod 34 out of the end position shown in FIG. 4, to the right in FIGS. 2, 3 and 4, is damped less than the movement into the end position.

The switching properties can be made more abrupt, for example in that at least one radially outwardly protruding projection 56 (see FIG. 3) is provided at the transition between the two longitudinal portions 48a1 and 48a2 of the widening portion 48a of the switching element 48 and/or in that at least one radially inwardly protruding projection 58 (see FIG. 4), which has to be overcome by the respective friction element 46, 50, is provided at the transition between the two longitudinal portions 32d and 32e of the receiving tube 32. The at least one projection 56 and/or 58 may be in the form of an annular rib. However, it is also possible to provide an individual projection or a plurality of individual projections distributed preferably substantially evenly over the circumference.

Figure 5:
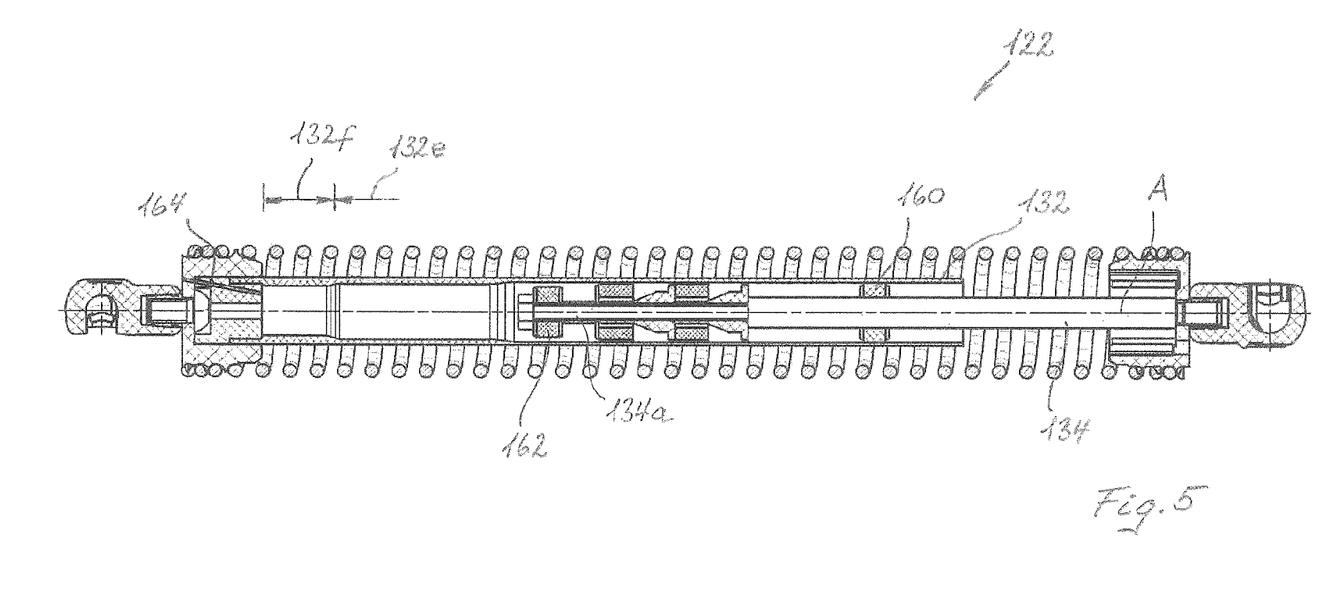
FIG. 5 is a section drawing of a second embodiment of a spring element according to the invention.

FIG. 5 shows a second embodiment of the spring unit according to the invention. Since the embodiment of FIG. 5 only differs from the embodiment of FIGS. 2, 3 and 4 in a few details, in FIG. 5 analogous parts are provided with the same reference numerals as in FIGS. 2, 3 and 4 but increased by 100. Further, the spring unit 122 is only described in the following in so far as it differs from the spring unit 10, to the description of which reference is thus hereby expressly made.

A first difference between the spring unit 22 and the spring unit 122 is that a predetermined basic friction is produced throughout the relative movement path of the receiving tube 132 and the rod 134 by means of a friction element 160 arranged rigidly on the rod 134.

A second difference between the spring unit 22 and the spring unit 122 is that the receiving tube 132 comprises a third longitudinal portion 132f, the internal diameter of which is even smaller than the internal diameter of the second longitudinal portion 132e, and in that a friction element 162, gripped undisplaceably in the longitudinal direction A between two discs operatively connected to the rod, is assigned to the end 134a of the rod 134, and, when it has entered frictional engagement with the third longitudinal portion 132f, produces a static friction greater than the forces acting on the spring unit 122 as a result of gravity. As a result, a holding function can be provided which also holds the spring unit in the end position, for example in the position corresponding to the open state of the boot lid of the motor vehicle, counter to the forces acting thereon as a result of gravity.

A third difference between the spring unit 22 and the spring unit 122 is that a ventilation passage 164 is provided, which prevents excessive compression of the air enclosed in the third longitudinal portion 132f between the friction element 162 and the friction tube 132 after the entry of said friction element 162. If desired, a throttle and/or a valve may be assigned to the ventilation passage 164.

The invention claimed is:

1. A movement-damping unit, comprising:
a receiving tube having a longitudinal axis,
a relative movement unit which is received in the receiving tube and which is displaceable back and forth relative to the receiving tube substantially in the direction of the longitudinal axis, and
a friction device acting between the receiving tube and the relative movement unit, wherein the friction device comprises at least one switching element assigned to the relative movement unit and having an engagement portion formed so as to widen radially in the direction of the longitudinal axis, at least one resiliently compressible friction element, which comprises a recess intended for engagement with the engagement portion and is arranged on the longitudinal face of smaller diameter of the switching element, being assigned to each switching element;
wherein the receiving tube comprises a first longitudinal portion and a second longitudinal portion, the internal diameter of the first longitudinal portion being larger than the internal diameter of the second longitudinal portion, wherein the at least one friction element is displaceable between the first longitudinal portion and the second longitudinal portion.

2. The movement-damping unit according to claim 1, wherein a stop element is assigned to the switching element, adjacently to the longitudinal end thereof of smaller diameter.

3. The movement-damping unit according to claim 2, wherein the switching element and the stop element are formed as separate components.

4. The movement-damping unit according to claim 1, wherein the switching element is provided, on the longitudinal end thereof of smaller diameter, with a bearing portion, on which the at least one friction element assigned to the switching element is mounted displaceably relative to the switching element in the direction of the longitudinal axis.

5. The movement-damping unit according to claim 4, wherein the switching element and the bearing portion are formed integrally.

6. The movement-damping unit according to claim 1, wherein the switching element is provided with an annular shoulder at the longitudinal end thereof of larger diameter.

7. The movement-damping unit according to claim 1, wherein the at least one switching element is operatively connected to the relative movement unit.

8. The movement-damping unit according to claim 1, wherein the engagement portion of the switching element has a first longitudinal portion, in which the engagement portion widens radially, and a second longitudinal portion, formed so as to be directly adjacent to the widened end of the first longitudinal portion of the engagement portion of the switching element and preferably formed in a substantially cylindrical manner.

9. The movement-damping unit according to claim 8, wherein the radial widening extends in a rounded manner at least in the transition between the two longitudinal portions.

10. The movement-damping unit according to claim 1, wherein the recess in the friction element is formed as a substantially cylindrical recess.

11. The movement-damping unit according to claim 1, wherein the recess in the friction element is formed in a manner adapted to the shape of the radial widening of the engagement portion.

12. The movement-damping unit according to claim 1, wherein either the relative movement unit is held positively on the receiving tube adjacently to the end of the second longitudinal portion of the receiving tube facing away from the first longitudinal portion of the receiving tube, or a third longitudinal portion of the receiving tube is connected to the end of the second longitudinal portion of the receiving tube facing away from the first longitudinal portion of the receiving tube, the relative movement unit being held in a frictional fit in this third longitudinal portion of the receiving tube.

13. A spring unit comprising the movement-damping unit according to claim 1, wherein a first connection element for connection to a first superordinate assembly is provided at the end of the receiving tube opposing the end of the receiving tube at which the relative movement unit exits the receiving tube, wherein a second connection element for connection to a second superordinate assembly is provided at the end of the relative movement unit projecting out of the receiving tube, and wherein a spring surrounding the receiving tube is provided, one end of said spring being braced directly or indirectly on the first connection element and the other end thereof being braced directly or indirectly on the second connection element.

\* \* \* \* \*